United States Patent
Arslan

(10) Patent No.: US 9,160,465 B2
(45) Date of Patent: Oct. 13, 2015

(54) SPUR CANCELLATION SYSTEMS AND RELATED METHODS

(71) Applicant: Silicon Laboratories Inc., Austin, TX (US)

(72) Inventor: Guner Arslan, Austin, TX (US)

(73) Assignee: Silicon Labortories Inc., Austin, TX (US)

( * ) Notice: Subject to any disclaimer, the term of this patent is extended or adjusted under 35 U.S.C. 154(b) by 0 days.

(21) Appl. No.: 14/074,355

(22) Filed: Nov. 7, 2013

(65) Prior Publication Data

US 2015/0124914 A1    May 7, 2015

(51) Int. Cl.
*H03D 1/04* (2006.01)
*H04B 15/04* (2006.01)

(52) U.S. Cl.
CPC ...................................... *H04B 15/04* (2013.01)

(58) Field of Classification Search
CPC .... H04B 1/1036; H04B 1/7107; H04B 1/707; H04B 15/04; H04L 27/2647
USPC .......................... 375/133, 147, 260, 296, 346
See application file for complete search history.

(56) References Cited

U.S. PATENT DOCUMENTS

| | | | |
|---|---|---|---|
| 6,151,488 A | 11/2000 | Brekelmans | |
| 7,002,639 B2 | 2/2006 | Kawai | |
| 7,167,694 B2 | 1/2007 | Khoini-Poorfard et al. | |
| 7,272,373 B2 | 9/2007 | Tuttle et al. | |
| 7,447,491 B2 | 11/2008 | Khoini-Poorfard | |
| 7,471,940 B2 | 12/2008 | Tuttle et al. | |
| 7,627,297 B2 | 12/2009 | Nam | |
| 7,783,259 B2 | 8/2010 | Dessert et al. | |
| 8,200,181 B1 | 6/2012 | Khlat et al. | |
| 8,290,100 B2 | 10/2012 | Komninakis et al. | |
| 8,320,858 B2 | 11/2012 | Ruelke et al. | |
| 8,427,366 B2 | 4/2013 | Ganeshan et al. | |
| 2005/0243217 A1 | 11/2005 | Yun et al. | |
| 2007/0116148 A1 | 5/2007 | Lowe et al. | |
| 2007/0153878 A1* | 7/2007 | Filipovic | 375/147 |
| 2007/0268170 A1* | 11/2007 | Danzig et al. | 341/144 |
| 2007/0298730 A1 | 12/2007 | Tandy | |
| 2010/0214145 A1* | 8/2010 | Narasimhan et al. | 341/155 |
| 2011/0007839 A1* | 1/2011 | Tang et al. | 375/296 |
| 2013/0196609 A1 | 8/2013 | Ancora et al. | |

* cited by examiner

*Primary Examiner* — Syed Haider
(74) *Attorney, Agent, or Firm* — Egan, Peterman & Enders LLP.

(57) ABSTRACT

Spur cancellation systems and related methods are disclosed for radio frequency (RF) receivers and other implementations. Disclosed embodiments effectively remove spurs caused by digital clock signals or other spur sources by determining which spurs will fall within a channel selected to be tuned, utilizing a spur cancellation module to generate a cancellation signal, and subtracting this cancellation signal from the digital information. The cancellation signal can be initially generated with a known frequency and estimated values for unknown spur parameters, such as amplitude and phase. Digital feedback signals are then used to adjust the spur parameters. If the spur frequency is not known precisely, digital feedback signals can also be used to adjust the frequency of the cancellation signal. Where multiple receive paths are provided within a multi-receiver system, multiple spur cancellation modules can be used to remove spurs generated by digital clocks within each of the receive paths.

26 Claims, 5 Drawing Sheets

SPUR CANCELLATION SYSTEMS AND RELATED METHODS

TECHNICAL FIELD

The disclosed embodiments relate to spur cancellation and, more particularly, to spur cancellation for spurs caused by digital clock signals within radio frequency (RF) receivers.

BACKGROUND

Current radio frequency (RF) receiver integrated circuits (ICs) often convert analog signals associated with broadcast channels to digital information and then perform digital processing on this digital information to generate digital data associated with a selected channel. As part of this digital processing, digital clocks are utilized to operate analog-to-digital converters and digital processing blocks. These digital clocks, however, can generate undesirable spurs at frequencies within the broadcast channels being tuned. Frequency planning can be used to adjust digital clock frequencies among a number of specific pre-determined clock frequencies to cause such interfering spurs to fall outside the frequency range for the channel to be tuned. However, this frequency planning can be difficult to achieve, and where multiple receive paths are included within a single integrated circuit or multi-chip package in order to tune multiple different channels at the same time, frequency planning can become practically impossible to achieve for certain combinations of channels and digital clock spurs being selected and generated by the digital clocks associated with the different receive paths.

SUMMARY

Spur cancellation systems and related methods are disclosed for radio frequency (RF) receivers and other implementations. As described further herein, the disclosed embodiments effectively remove spurs caused by digital clock signals or other spur sources by determining which spurs will fall within a channel selected to be tuned, utilizing a spur cancellation module to generate a cancellation signal, and subtracting this cancellation signal from the digital information being processed by a digital processor. The cancellation signal can be initially generated with a known frequency and estimated values for unknown spur parameters, such as amplitude and phase. Digital feedback signals are then used to adjust the spur parameters for the cancellation signal, such as amplitude and phase values, to effectively remove the spur from the digital information being processed for the channel being tuned. If the spur frequency is not known precisely, digital feedback signals can also be used to adjust the frequency of the cancellation signal. Further, where multiple receive paths are provided within a multi-receiver system, multiple spur cancellation modules can be used to remove spurs generated by digital clocks within each of the receive paths. Other features and variations could also be implemented, as desired, and related systems and methods can be utilized, as well.

For one embodiment, a spur cancellation system is disclosed that includes a digital processor configured to receive and process digital information associated with a channel within radio frequency (RF) input signals and to output digital data associated with the channel, a digital clock generator configured to output at least one digital clock signal to the digital processor based upon an oscillation signal, a spur cancellation module configured to generate a spur cancellation signal for a digital clock spur that falls within the channel where the digital clock spur being associated with the oscillation signal, and a combiner within the digital processor configured to subtract the spur cancellation signal from the digital information.

In other embodiments, the digital clock spur can be caused by the digital clock generator, and the spur cancellation module can be configured to receive a digital clock signal based upon the oscillation signal. Further, the digital clock spur can be caused by an additional digital clock generator configured to output at least one additional digital clock signal based upon the oscillation signal. Still further, the spur cancellation system can further include a radio frequency (RF) front-end configured to receive the RF input signals and to output analog signals associated with the channel and an analog-to-digital converter (ADC) configured to receive the analog signals, to convert the analog signals into digital information, and to provide the digital information to the digital processor. In addition, the digital processor can be configured to demodulate the digital information to output the digital data.

In additional embodiments, the spur cancellation module can also include a spur generator configured to receive a nominal spur frequency associated with the digital clock spur, to receive one or more spur parameters, and to generate the spur cancellation signal. Further, the spur parameters can include at least one of an amplitude value for the spur cancellation signal or a phase value for the spur cancellation signal. Still further, the spur parameters can include a frequency adjustment value for the spur cancellation signal. Also, the spur cancellation module can further include a spur adjustment module configured to provide the spur parameters to the spur cancellation signal generator and to adjust the spur parameters based upon an output from the combiner as feedback.

In still further embodiments, the spur cancellation system can include a control module configured to receive a channel select signal, to determine the digital clock spur for the selected channel, and to provide control signals to cause generation of the spur cancellation signal. Further, the spur cancellation system can also include a lookup table configured to store an indication of digital clock spurs that fall within each of a plurality of selectable channels, and the control module can be configured to use the lookup table to determine the digital clock spur for the selected channel. In addition, the digital processor can be further configured to generate a control signal based upon the digital information, and the control signal can determine at least in part whether or not the spur cancellation module generates a spur cancellation signal.

For still other embodiments, the digital processor, the digital clock generator, the spur cancellation module, and the combiner can be within a first receive path, and the spur cancellation system can further include at least one additional receive path where each additional receive path includes an additional digital processor, an additional digital clock generator, an additional spur cancellation module, and an additional combiner. Further, each receive path can include a separate spur cancellation module for each receive path. Also, each of the separate spur cancellation modules within each receive path can be configured to generate spur cancellation signals for digital clock spurs caused by one of the receive paths. Still further, the spur cancellation system can include a control module configured to receive channel select signals for the receive paths, to determine spurs that fall within selected channels, and to provide control signals to the receive paths to cause generation of the spur cancellation signals. In addition, the spur cancellation system can include a lookup table configured to store an indication of digital clock spurs that fall within selectable channels, and the control module can be configured to use the lookup table to provide the control signals.

For one other embodiment, a method for spur cancellation is disclosed that includes processing digital information to output digital data associated with a channel within radio frequency (RF) input signals, generating at least one digital clock signal for the processing step based upon an oscillation signal, generating a spur cancellation signal associated with a digital clock spur that falls within the channel, the digital clock spur being associated with the oscillation signal, and subtracting the spur cancellation signal from the digital information as part of the processing step.

In other embodiments, the method can include receiving radio frequency (RF) input signals, outputting analog signals associated with the channel, and converting the analog signals into the digital information for the processing step. Further, the processing step can include demodulating the digital information to output the digital data.

In additional embodiments, the generating a spur cancellation signal step can include receiving a nominal spur frequency associated with the digital clock spur and using one or more spur parameters to generate the spur cancellation signal. Further, the spur parameters can include at least one of an amplitude value for the spur cancellation signal or a phase value for the spur cancellation signal. Also, the spur parameters can include a frequency adjustment value for the spur cancellation signal. Still further, the method can include adjusting the spur parameters based upon a result of the subtracting step. In addition, the method can include generating a control signal based upon the digital information to determine at least in part an update speed for the adjusting step.

In still further embodiments, the method can include receiving a channel select signal and determining the digital clock spur based upon the selected channel. Further, the method can include using a lookup table to determine the digital clock spur for the selected channel.

For still other embodiments, the processing, generating, and subtracting steps are performed within a first receive path, and the method further includes performing these steps in at least one additional receive path. Further, each receive path can generate spur cancellation signals for digital clock spurs caused by at least one digital clock within each additional receive path. Still further, the method can include receiving a channel select signal for each receive path and using a lookup table to determine digital clock spurs that fall within selected channels.

Different features and variations could also be implemented, as desired, and related systems and methods can be utilized, as well.

DESCRIPTION OF THE DRAWINGS

It is noted that the appended drawings illustrate only exemplary embodiments and are, therefore, not to be considered limiting of the scope of the invention, for the invention may admit to other equally effective embodiments.

DETAILED DESCRIPTION

Spur cancellation systems and related methods are disclosed for radio frequency (RF) receivers and other implementations. As described further herein, the disclosed embodiments effectively remove spurs caused by digital clock signals or other spur sources by determining which spurs will fall within a channel selected to be tuned, utilizing a spur cancellation module to generate a cancellation signal, and subtracting this cancellation signal from the digital information being processed by a digital processor. The cancellation signal can be initially generated with a known frequency and estimated values for unknown spur parameters, such as amplitude and phase. Digital feedback signals are then used to adjust the spur parameters for the cancellation signal, such as amplitude and phase values, to effectively remove the spur from the digital information being processed for the channel being tuned. If the spur frequency is not known precisely, digital feedback signals can also be used to adjust the frequency of the cancellation signal. Further, where multiple receive paths are provided within a multi-receiver system, multiple spur cancellation modules can be used to remove spurs generated by digital clocks within each of the receive paths. Different features and variations can be implemented for the embodiments described herein, and related systems and methods can be utilized, as well.

Figure 1:
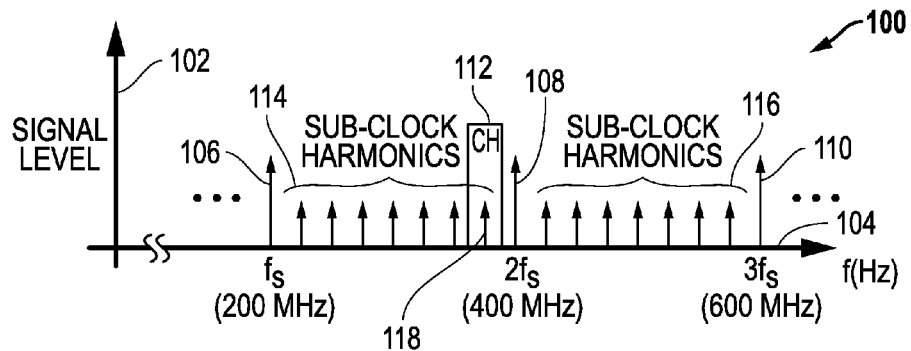
FIG. 1 is a diagram of an example embodiment for digital clock spurs for an example receive path having sub-clocks related to a sampling clock ($f_s$) for analog-to-digital conversion.

FIG. 1 is a diagram of an example embodiment 100 for digital clock spurs for an example receive path having sub-clocks related to a sampling clock ($f_s$) for analog-to-digital conversion. The x-axis 104 represents frequency in Hertz (Hz), and the y-axis represents a signal level. The sampling frequency ($f_s$) 106 is shown along with the second harmonic ($2f_s$) 108 and the third harmonic ($3f_s$) 110 for the sampling frequency ($f_s$). Higher harmonics would also exist. For embodiment 100, it is assumed that multiple digital sub-clocks have been generated for digital processing and are related to the sampling frequency ($f_s$) 106 by ½, ¼, and ⅛ of the sampling frequency ($f_s$) 106, although other dividers could be used as well. These sub-clocks will cause digital spur harmonics 114 between the sampling frequency ($f_s$) 106 and the second harmonic ($2f_s$) 108 and will also cause digital spur harmonics 116 between the second sampling frequency harmonic ($2f_s$) 108 and the third sampling frequency harmonic ($3f_s$) 110, as well as other harmonics that are not shown. Some of these digital clock spurs may fall within the frequency range for a channel being tuned. For example, channel (CH) 112 is a representative channel that has been selected to be tuned within a receive path, and one sub-clock harmonic 118 falls within this channel (CH) 112. This digital clock spur can adversely affect the received signal in this channel (CH) 112. As one example for particular values, if the sampling frequency ($f_s$) 106 is 200 MHz, the second harmonic ($2f_s$) 108 will fall at 400 MHz and the third harmonic ($3f_s$) 110 will fall at 600 MHz. If the digital sub-clocks are ½, ¼, and ⅛ of the sampling frequency ($f_s$) 106, these digital sub-clocks will then fall at 100 MHz, 50 MHz, and 25 MHz, respectively. Further, the harmonics for these digital sub-clocks will fall on the sampling clock harmonics and will also cause the sub-clock harmonics 114/116 that fall between the sampling clock harmonics.

Advantageously, the disclosed embodiments improve digital data obtained from received channels by effectively removing digital clock spurs, such as spur 118, that fall within a channel being processed within a receive path, such as channel (CH) 112. Spurs from other sources can similarly be removed by the disclosed embodiments. This removal is accomplished by determining what spurs will fall within a selected channel, utilizing a cancellation module to generate a spur cancellation signal, subtracting the spur cancellation signal from digital information being processed for the channel, and using feedback to adjust spur parameters, such as amplitude and phase values, for the spur cancellation signal. While the frequencies of digital clock spurs within a selected channel can be determined because the digital clock frequencies are known and the channel frequencies are known, the feedback is used to adjust the spur parameters (e.g., phase and amplitude) so that the spur cancellation signal will settle to steady state values that effectively remove the digital clock spur. If the spur frequency is not known precisely, digital feedback signals can also be used to adjust the frequency of the cancellation signal. It is further notated that if multiple spurs land within the channel, a cancellation signal can be generated for each of these spurs.

Figure 2:
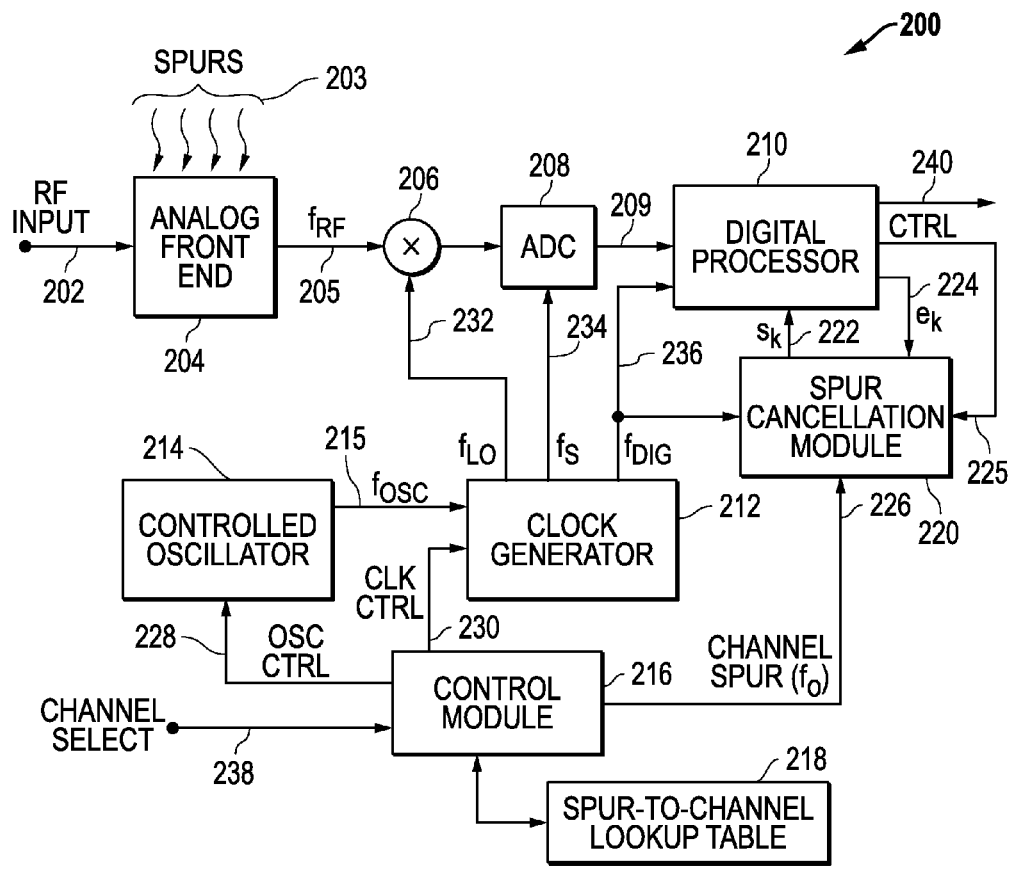
FIG. 2 is a block diagram of an example embodiment for an RF receiver that includes a spur cancellation module.

FIG. 2 is a block diagram of an example embodiment 200 for an RF receiver that includes a spur cancellation module 220. RF input signals 202 are received by an analog front end 204, which can include filters, low noise amplifiers, variable gain amplifiers, and/or other desired circuitry. The RF input signals can include, for example, channels within a broadcast spectrum, such as broadcast channels that include audio and/or video content. For television broadcasts, the RF input signals 202 can be received from a cable connection, a terrestrial antenna, a satellite receiver, and/or any other desired source. A mixer 206 receives RF signals ($f_{RF}$) 205 from the analog front end 204 and a local oscillator mixing signal ($f_{LO}$) 232 from clock generator 212. As described further below, the mixing signal ($f_{LO}$) 232 is determined by the channel select signal 238. The output of mixer 206 is a down-converted signal that centers a selected channel at a desired intermediate frequency (IF), low-IF, or zero IF, as desired, depending upon the architecture selected for the RF receiver. The analog-to-digital converter (ADC) 208 receives and digitizes the down-converted signal and then provides digital information 209 to the digital processor 210. The digital processor 210 digitally processes the digital information 209 and outputs digital data 240 representing content within the tuned channel.

The clock generator 212 generates the local oscillator mixing signal ($f_{LO}$) 232, the sampling clock ($f_s$) for the ADC 208, and a digital clock ($f_{DIG}$) 236 for the digital processor. Preferably, these three clock signals are related by divider or multiplier values and are all based upon a common oscillation signal ($f_{OSC}$) 215. A controlled oscillator 214, such as a voltage controlled oscillator, can be used to generate the common oscillation signal ($f_{OSC}$) 215. A control module 216 can be configured to provide oscillation control (OSC CTRL) signals 228 to the controlled oscillator 214 and clock control (CLK CTRL) signals 230 to the clock generator 212. As indicated above, the local oscillator mixing signal ($f_{LO}$) 232 is adjusted based upon the channel select signal 238 so that the RF signal ($f_{RF}$) is down-converted to a desired target frequency, such as an IF, low-IF, or zero-IF target frequency. It is further noted that the spur cancellation module 220 can also receive and use the digital clock ($f_{DIG}$) 236 for its operations.

As shown with respect to FIG. 1, the digital clock signals generated by clock generator 212 and harmonics of these digital clock signals cause digital clock spurs 203 that can fall within the channel selected to be tuned and thereby potentially degrade digital data generated from this channel. The digital clock spurs 203 can also cause performance problems directly within the digital processing for the receive path, as well. Advantageously, the spur cancellation module 220 effectively removes these digital clock spurs by generating a spur cancellation signal ($s_k$) 222 that matches the frequency of a digital clock spur falling within the selected channel. The spur cancellation module 220 can also generation cancellation signals ($s_k$) 222 to remove spurs from sources other than digital clocks. This spur cancellation signal ($s_k$) 222 is provided to the digital processor 210, and the digital processor 210 subtracts it from digital information being processed for the received channel. A digital feedback signal ($e_k$) 224 is provided back to the spur cancellation module 220, and the spur cancellation module 220 uses this digital feedback signal ($e_k$) 224 to adjust spur parameters, such as the amplitude and phase for the spur cancellation signal ($s_k$) 222, to effectively remove the spur from the channel. It is noted that additional spur cancellation signals can be generated if multiple spurs are determined to fall within a channel being processed.

The control module 216 can be configured to determine which spurs including digital clock spurs will fall within a channel selected to be tuned or processed by the channel select signal 238. The control module 216 can then provide a nominal spur frequency ($f_0$) 226 to the spur cancellation module 220. This nominal spur frequency ($f_0$) 226 represents a spur, such as a digital clock spur, that will fall within the channel selected to be tuned, as described in more detail below. Because the digital clock frequencies generated by clock generator 212 and related harmonics can be pre-determined, a spur-to-channel lookup table 218 can be provided that identifies which digital clock spurs will fall within a selected channel. As such, the control module 216 can access the spur-to-channel lookup table 218 each time a new channel is selected by the channel select signal 238 to determine which digital clock spurs will fall within the selected channel. The spur-to-channel lookup table 218 can also be used to store information identifying other known spurs that will fall within channels that can be selected for tuning. The control module 216 can then provide the appropriate nominal spur frequency ($f_0$) 226 to the spur cancellation module 220 to indicate what spur cancellation signal should be generated.

It is noted that a wide variety of receive path architectures can be implemented while still utilizing the spur cancellation techniques described herein. For example, RF receivers, demodulators, and other receive path circuitry, modules, or processing blocks can utilize the disclosed embodiments. RF receivers can include dual down-conversion, low-IF down-conversion, direct down conversion, direct spectrum digitization without down conversion, and/or other desired receiver architectures that can be utilized for receiving RF input signals. It also is noted that the RF receiver 200 can be configured to receive channels within frequency bands across a wide range of frequencies, from thousands of Hertz to gigahertz frequencies and above. The content within the channels for the received frequency bands can include audio, video, data, and/or other desired content. Further, demodulators and/or other digital processors that process digital information associated with a selected channel with RF input signals can utilize the spur cancellation techniques and embodiments described herein.

Figure 3:
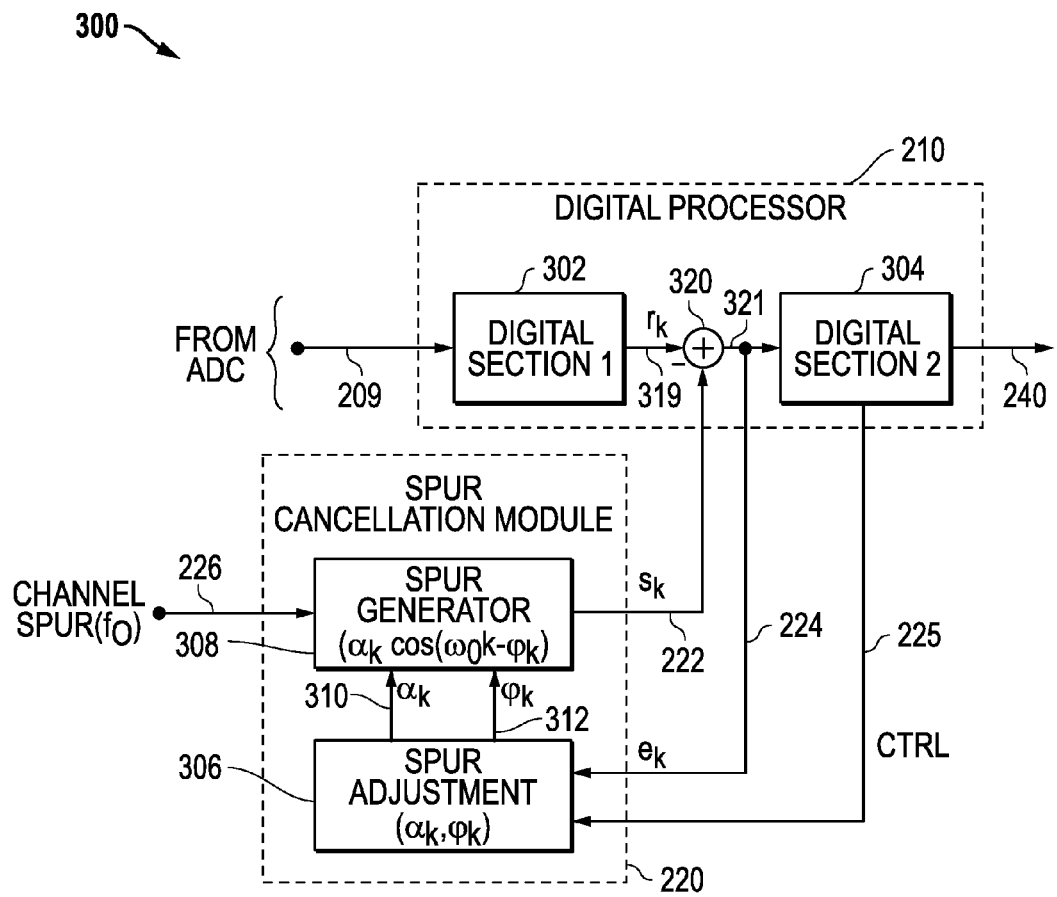
FIG. 3 is a block diagram of an example embodiment for the digital processor and the spur cancellation module.

FIG. 3 is a block diagram of a further example embodiment 300 for the digital processor 210 and the spur cancellation module 220. For the embodiment 300 depicted, the digital processor includes a digital combiner 320 that is positioned between a first digital section (SECTION1) 302 and a second digital section (SECTION2) 304. The first digital section 302 receives and processes the digital information 209 from the ADC 208. For example, the first digital section 302 can in part filter the digital information from the ADC 208. The output digital information ($r_k$) 319 is provided to the combiner 320 and will still include a spur, if one is present within the channel. The combiner 320 subtracts the spur cancellation signal ($s_k$) 222 from the digital information ($r_k$) 319 to output adjusted digital information 321. This adjusted digital information 321 provides the digital feedback signal ($e_k$) 224 for the spur cancellation module 220. The adjusted digital information 321 is also provided to the second digital section 304. The second digital section 304 further processes the adjusted digital information 321 and outputs the digital data 240. For example, the second digital section 304 can decimate, demodulate, and otherwise process the digital information 321 to produce digital data 240 associated with the channel being tuned. It is noted that the combiner 320 could also be positioned in different locations within the digital processor 210. It is further noted that the digital information 209 can be provided from a source other than an ADC 208, if desired.

For further embodiments, it is further noted that a control signal (CTRL) 225 can be provided to the spur adjustment module 306 from the second digital section (SECTION2) 304 to provide control or content information that can be used to adjust the adaptation speed of the spur adjustment module 306 or to start and/or stop the updates to the spur parameters. For example, in an analog television (TV) receiver, a demodulator could indicate blanking periods during which time no desired content is received. This indication could be used to increase the adaptation speed of the spur parameters because the desired signals will not interfere with the estimation of the undesired spur signal. In still further embodiments, the spur adjustment block 306 can be configured to stop adaptation or adjustment of the spur parameters, for example, until the control signal 225 indicates the presence of a blanking period. Further, the control signal 225 can start/stop the spur cancellation module by determining whether or not the spur cancellation module 220 generates a spur cancellation signal 222.

The spur cancellation module 220 includes spur generator 308 and spur adjustment module 306. The spur generator 308 receives the nominal spur frequency ($f_0$) 226 for a spur that has been determined to exist within the channel to be tuned. The nominal spur frequency ($f_0$) 226 can also be configured to represent the spur frequency after any down-conversion that has preceded the combiner 320. For example, for embodiment 200 of FIG. 2, if a channel were originally centered at 410 MHz, a spur were located at 412.5 MHz, and the mixing signal ($f_{LO}$) were 405 MHz, the channel would be down-converted by mixer 206 to a low-IF of 5 MHz, and the clock spur would be down-converted to 7.5 MHz (e.g., 412.5 MHz–405 MHz=7.5 MHz). For such an embodiment, the nominal spur frequency ($f_0$) would also be 7.5 MHz as it represents the frequency for the down-converted spur. It is noted that this example could be associated with television broadcast channels where the channel width is typically 6-8 MHz, and the broadcast band is in a range of 50 MHz to 1 GHz. The disclosed embodiments could also be used with other broadcast bands and channel widths as desired.

It is further noted that if the digital clocks, the local oscillator mixing signals, and the spur cancellation signal are generated from the same clock reference, any shift in the frequency of the clock reference due to imperfections or external conditions, such as temperature, also shifts the spur and the cancellation signal by the same amount. Advantageously, this similar shifting means that frequency adjustments or tracking is not necessary. However, if one of these signals is configured to have a separate clock source, the frequency of the spur and the cancellation signal may drift apart thereby requiring frequency tracking in addition to or instead of phase tracking.

The spur generator 308 receives the nominal spur frequency ($f_0$) and generates a spur cancellation signal ($s_k$) 222 based upon the nominal spur frequency ($f_0$). As part of this process, intervening sampling and further digital decimation is also considered. As one example, the following equation can be used to generate the a spur cancellation signal ($s_k$) 222.

$$s_k = \alpha_k \cos(\omega_0 k + \phi_k) \qquad \text{[EQUATION 1]}$$

For EQUATION 1, $\alpha_k$ represents an estimated amplitude value; $\phi_k$ represents an estimated phase value; and $\omega_0$ represents an angular frequency associated with the nominal spur frequency ($f_0$) and the intervening sampling frequency ($f_s$), which can be represented by the following equation.

$$\omega_0 = 2\pi(f_0/f_s) \qquad \text{[EQUATION 2]}$$

For EQUATION 2 and with respect to the embodiment 200 of FIG. 2, the nominal spur frequency ($f_0$) is the frequency of the spur once it has been down-converted by mixer 206, and the sampling frequency ($f_s$) is the sampling frequency ($f_s$) 234 for the ADC 208.

The spur adjustment module 306 initially provides estimates for the amplitude value ($\alpha_k$) 310 and the phase value ($\phi_k$) 312 to the spur generator 308 and then adjusts these values based upon the digital feedback signal ($e_k$) 224. In particular, the spur adjustment module 306 can be configured to analyze the digital feedback signal ($e_k$) 224 and to adjust the amplitude value ($\alpha_k$) 310 and the phase value ($\phi_k$) 312 over time in order to reduce and/or minimize the spur energy level at the nominal frequency ($f_0$) for the spur. In this way, the amplitude and phase for the spur cancellation signal ($s_k$) 222 are dynamically adjusted to steady state values to reduce and/or effectively eliminate the spur within the digital information being processed.

For further embodiments, it is noted that the amplitude could be adjusted alone, or the phase could be adjust alone, although adjusting both will likely achieve improved results. Furthermore, for cases where the spur frequency is not precisely known, the frequency for the spur cancellation signal could also be adjusted. As such, the frequency, amplitude, phase, or any combination thereof could be adjusted for the spur cancellation signal. It is noted that other parameters for the spur cancellation signal could also be adjusted in addition to or instead of frequency, amplitude, and/or phase. It is further noted that a LMS (least mean squares) algorithm can be used to calculate and adjust the spur parameters, if desired. For example, the following equations can be used to generate the amplitude value ($\alpha_k$) 310 and the phase value ($\phi_l$) 312.

$$\alpha_k = \alpha_{k-1} + (M_\alpha)(e_k)\cos(\omega_0 k + \phi_k) \qquad \text{[EQUATION 3]}$$

$$\phi_k = \phi_{k-1} - (M_\phi)(e_k)(\alpha_k)\sin(\omega_0 k + \phi_k) \qquad \text{[EQUATION 4]}$$

For EQUATIONS 3-4, $M_\alpha$ represents the step size used to adjust the amplitude value ($\alpha_k$) 310, and $M_\phi$ represents the step size used to adjust the phase value ($\phi_k$) 312. It is noted that other methods and algorithms can be used to adjust the phase, amplitude and/or frequency values including but not limited to signed-LMS algorithms, signed-signed LMS algorithms, RLS (recursive least squares) algorithms, Steepest-decent algorithms, Kalman filtering, expectation maximization (EM), and/or other techniques.

It is further noted the spur cancellation module 220 can also be configured to further process the digital feedback signal ($e_k$) prior to using it to adjust spur parameters, such as generate and adjusting amplitude values and phase values. For example, the spur cancellation module 220 can be configured to apply a band-pass filter around the frequency of the spur being cancelled to improve convergence of the amplitude values and/or phase values. Other variations could also be implemented, as desired.

Figure 4:
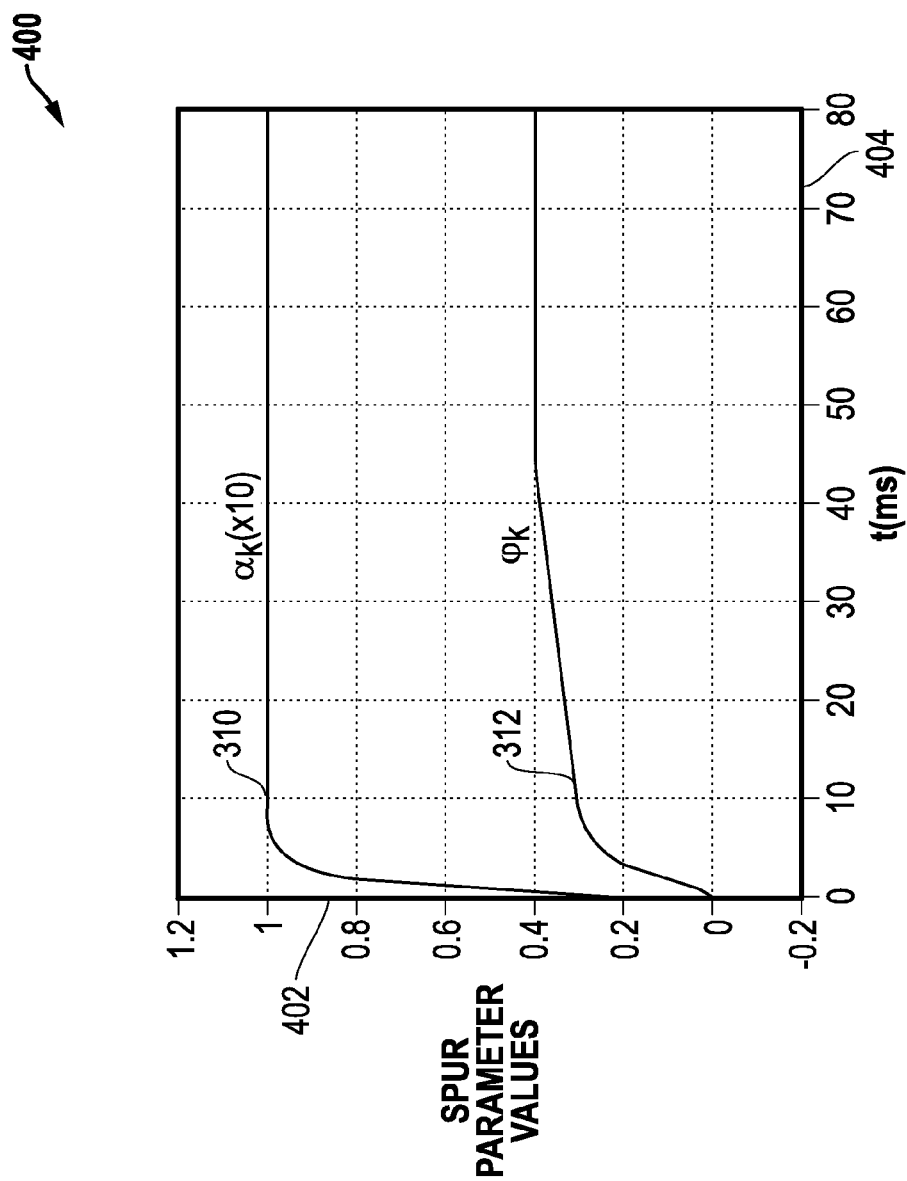
FIG. 4 is a diagram of an example embodiment for representative adjustments over time to an amplitude value ($\alpha_k$) and a phase value ($\phi_k$) for a spur cancellation signal.

FIG. 4 is a diagram of an example embodiment 400 for representative adjustments to the amplitude value ($\alpha_k$) 310 and the phase value ($\phi_k$) 312 over time for a spur cancellation signal ($s_k$) 222. The y-axis represents the parameter value, and the x-axis represents time in milliseconds (ms). It is noted that the values for the amplitude value ($\alpha_k$) 310 are 10-times (×10) the values indicated in the graph so as to make it easier to depict them along with the example values for the phase value ($\phi_k$) 312. For embodiment 400, the amplitude value ($\alpha_k$) 310 is initially set to 1.0 (i.e., 0.1 from graph times 10) and will converge to a steady state value, such as 10.0 (i.e., 1.0 from graph times ten), due to the operation of the spur adjustment module 306. The phase value ($\phi_k$) 312 is initially set to zero and will converge to a steady state value, such as 0.4, due to the operation of the spur adjustment module 306. It is noted that the actual steady state values will depend upon the energy level and phase of the actual spur falling within a selected channel during operation.

Figure 5:
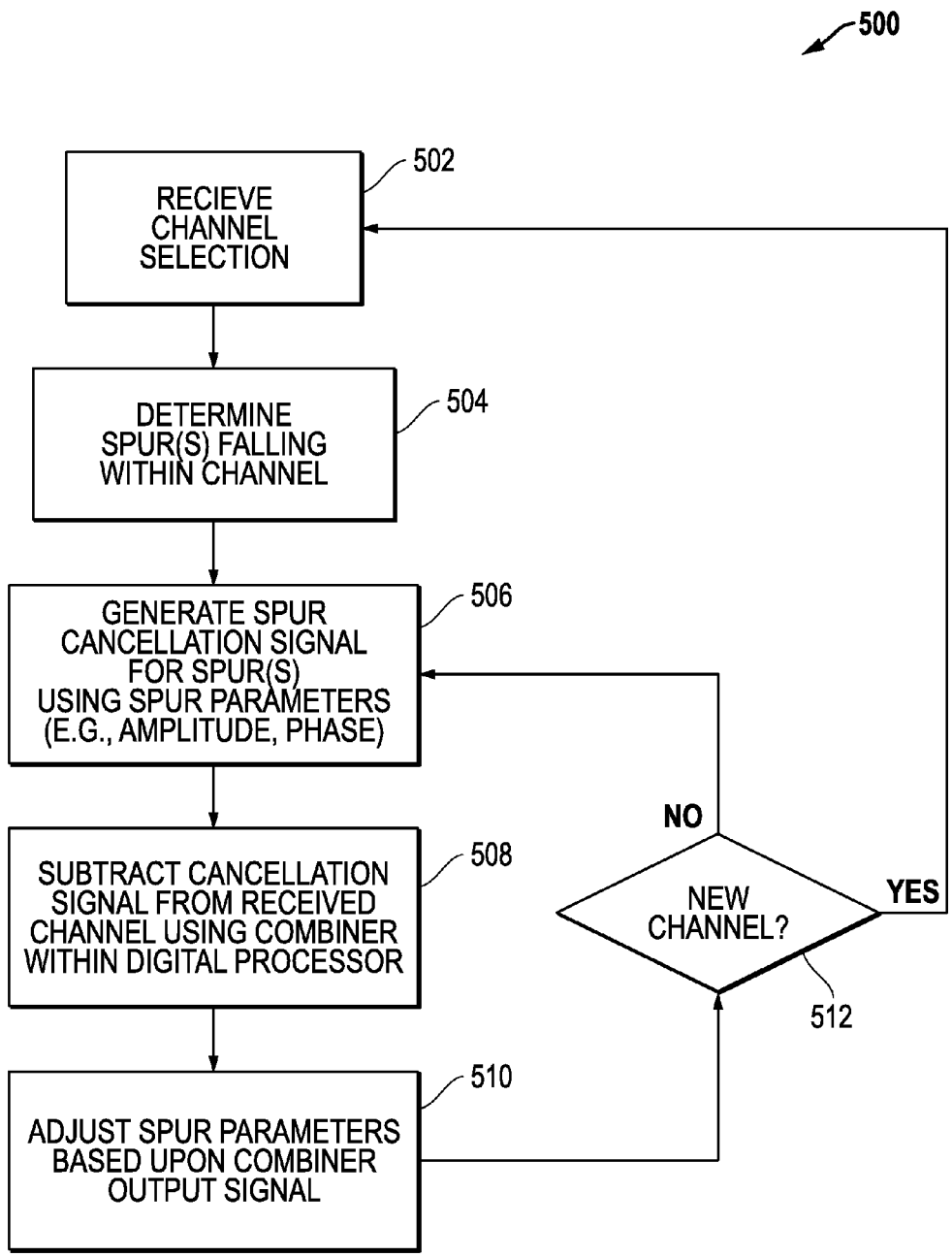
FIG. 5 is a flow diagram of an embodiment for providing spur cancellation.

FIG. 5 is a flow diagram of an embodiment 500 for providing spur cancellation. In block 502, a channel selection is received indicating a channel to be processed. In block 504, a determination is made whether one or more spurs (e.g., digital clock spurs), if any, will fall within the frequency range for the selected channel to be tuned. In block 506, a spur cancellation signal for a spur within the channel is then generated using spur parameters, such as for example, the amplitude value and/or the phase value described above. In block 508, the spur cancellation signal is subtracted from the digital information for the received channel using a combiner within the digital processor. In block 510, the spur parameters are adjusted based upon the output signal from the combiner. Flow then passes to block 512, where a determination is made if a new channel has been selected. If "NO," then flow passes back to block 506 where the spur cancellation signal is again generated. As described above, the adjustments to the spur parameters will converge to steady state values. If "YES," then flow passes back to block 502 where information identifying a new channel selection can be received.

While the embodiments described herein can be utilized for embodiments having a single receive path, the embodiments described herein are particularly useful for addressing digital clock spurs for systems having multiple receive paths. For example, additional receive paths on the same integrated circuit or within a multi-chip package increase the complexity of handling digital clock spurs as the receive paths can be using different digital clock frequencies to tune to different channels. Advantageously, multiple versions of the spur cancellation modules described herein can be used to remove spurs caused by these additional digital clocks. For example, if a plurality of different receive paths are provided within an integrated circuit or multi-chip package, a plurality of different spur cancellation modules can be used within each receive path to remove the digital clock spurs caused by that receive path and digital clock spurs caused by each of the other receive paths. Further, the different receive paths can communicate to each other any changes to the digital clock frequencies for each of the receive paths, and these changes can be tracked and updated so that the spur cancellation modules within each of the receive paths can be adjusted accordingly. In addition, the different receive paths can utilize a single common oscillation signal, such as a crystal reference frequency, to generate digital clocks utilized within the different receive paths. Still further, the base digital clock frequencies for each of the receive paths can be selected to be sufficiently far apart as to separate the spurs generated by each of the receive paths. Other variations could also be implemented.

Figure 6:
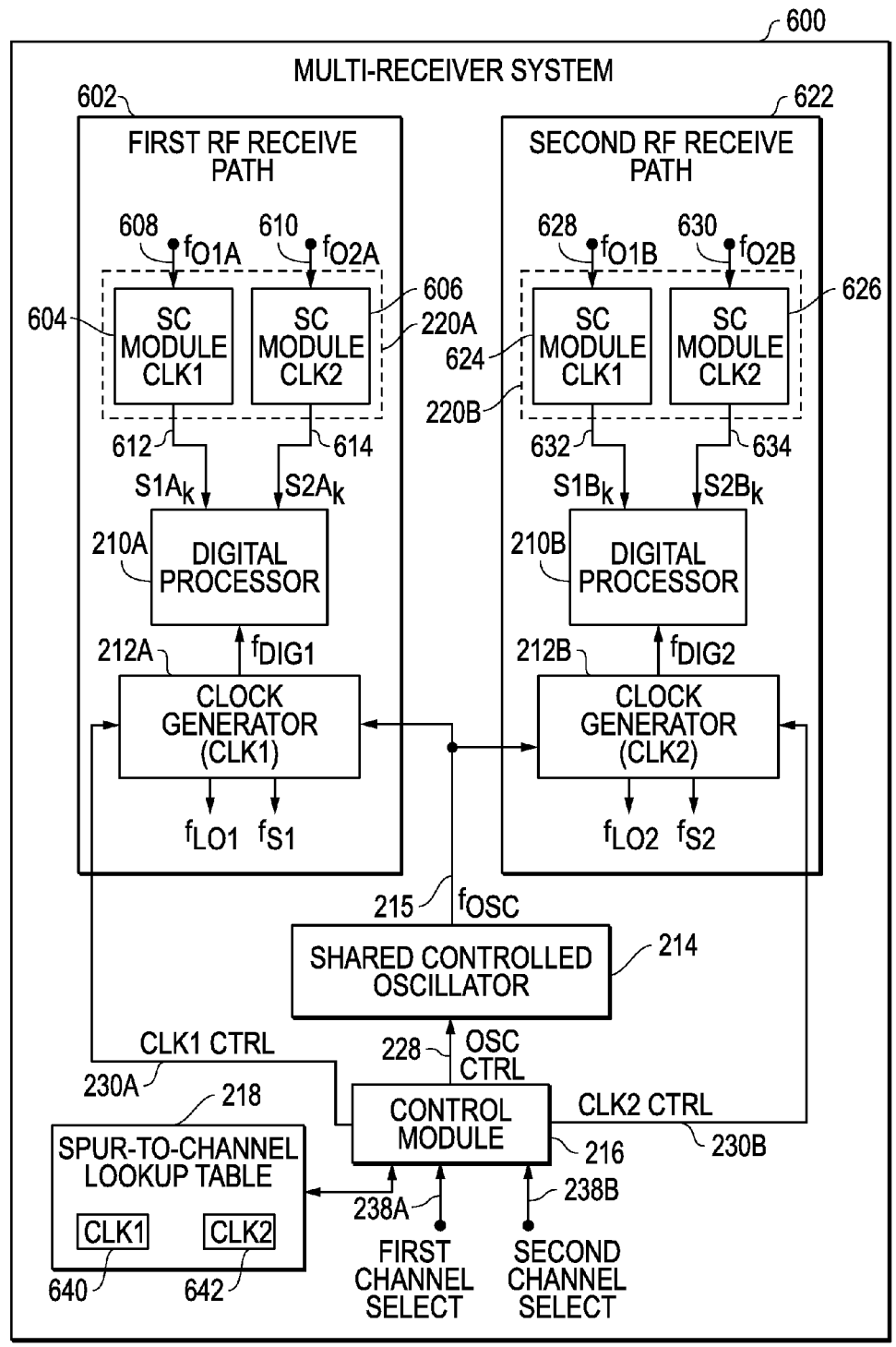
FIG. 6 is a block diagram of an example embodiment for a multi-receiver system that includes two receive paths and utilizes multiple spur cancellation modules per receive path.

FIG. 6 is a block diagram of an example embodiment for a multi-receiver system 600 that includes two receive paths 602/622 and utilizes the spur cancellation techniques described herein. The first RF receive path 602 and the second RF receive path 622 can be, for example, integrated within a single integrated circuit or packaged within a single multi-chip package to form the multi-receiver system 600. Other multiple receive path configurations could also be utilized. The first RF receive path 602 includes a first spur cancellation module 220A, a first digital processor 210A, and a first clock generator 212A that generates a first mixing signal ($f_{LO1}$), a first sampling clock ($f_{s1}$), and a first digital clock ($f_{DIG1}$) that can be utilized by the first RF receive path 602 as described above with respect to the embodiments of FIGS. 2-5. Similarly, the second RF receive path 622 includes a second spur cancellation module 220B, a second digital processor 210B, and a second clock generator 212B that generates a second mixing signal ($f_{LO2}$), a second sampling clock ($f_{s2}$), and a second digital clock ($f_{DIG2}$) that can be utilized by the second receive path 622 as described above with respect to the embodiments of FIGS. 2-5. It is noted that for the embodiment depicted, the first receive path 602 and the second receive path 622 utilize a common shared controlled oscillator 214, which provides a common oscillation signal ($f_{OSC}$) 215 to both receive paths. However, it is understood that each receive path could also have its own controlled oscillator and/or use a different oscillation signal for its digital clocks, if desired.

Because there are multiple digital clock generators 212A/212B and multiple digital processors 210A/210B operating in the multi-receiver system 600, there are multiple sets of digital clock spurs that are preferably addressed within each receive path 602/622. As shown, each of the RF receive paths 602/622 include two spur cancellation (SC) module blocks within each spur cancellation module 220A/220B with one being used to generate spur cancellation signals associated with the digital clocks (CLK1) for the first receive path and with the other being used to generate spur cancellation signals associated with the digital clocks (CLK2) for the second receive path. Thus, the first receive path 602 includes a first SC module 604 that receives a first nominal spur frequency ($f_{o1A}$) 608 and generates a first spur cancellation signal ($s_{k1A}$) 612. The first receive path 602 also includes a second SC module 606 that receives a second nominal spur frequency ($f_{o2A}$) 610 and generates a second spur cancellation signal ($s_{k2A}$) 614. Similarly, the second receive path 622 includes a first SC module 624 that receives a first nominal spur frequency ($f_{o1B}$) 628 and generates a first spur cancellation signal ($s_{k1B}$) 632. The second receive path 622 also includes a second SC module 626 that receives a second nominal spur frequency ($f_{o2B}$) 630 and generates a second spur cancellation signal ($s_{k2B}$) 634. The nominal spur frequencies ($f_{o1A}$, $f_{o2A}$) 608/610 for the first receive path 602 and the nominal spur frequencies ($f_{o1B}$, $f_{o2B}$) 628/630 for the second receive path 622 can be generated by a shared control module 216, if desired, although each receive path could also have its own control module. Further, each of the SC module blocks 604/606/624/626 can be implemented as described herein with respect to spur cancellation module 220 in FIGS. 2-3.

For embodiment 600 and similar to embodiment 200 of FIG. 2, the control module 216 can be used to provide clock control signals (CLK1 CTRL) 230A to the clock generator 212A for the first RF receive path 602 and to provide clock control signals (CLK2 CTRL) 230B to the clock generator 212B for the second RF receive path 622. Further, to determine the appropriate nominal spur frequencies to provide to the spur cancellation modules, the control module 216 can utilize a spur-to-channel lookup table 218 that includes first lookup information 640 for the digital clocks (CLK1) within the first receive path 602 and second lookup information 642 for the digital clocks (CLK2) within the second receive path 622. The control module 216 can also receive a first channel select signal 238A that determines the channel to be tuned by the first RF receive path 602 and a second channel select signal 238B that determines the channel to be tuned by the second RF receive path 622. The control module 216 can also provide other control signals to the receive paths 602/622, if desired, and can provide an oscillator control signal 228 to the shared controlled oscillator 214. It is again noted that the control module 216 and/or the lookup table 218 can be distributed within each receive paths 602/622, if desired, rather than utilizing a common control module and a common lookup table. Other variations could also be implemented while still utilizing the spur cancellation module embodiments described herein.

It is noted that the functional blocks and modules described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

Further modifications and alternative embodiments will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the example embodiments. Various changes may be made in the implementations and architectures described herein. For example, equivalent elements may be substituted for those illustrated and described herein, and certain features of the embodiments may be utilized independently of the use of other features, as would be apparent to one skilled in the art after having the benefit of this description.

What is claimed is:

1. A spur cancellation system, comprising:
   an analog-to-digital converter (ADC) configured to receive analog signals associated with a channel within radio frequency (RF) input signals and to convert the analog signals into digital information based upon a sampling clock;
   a digital processor configured to receive and process the digital information from the ADC based upon a digital clock and to output digital data associated with the channel;
   a digital clock generator configured to output the sampling clock to the ADC and the digital clock to the digital processor based upon an oscillation signal;
   a controlled oscillator configured to generate the oscillation signal;
   a spur cancellation module configured to use the digital clock in its operation to generate a spur cancellation signal for a digital clock spur that falls within the channel, the digital clock spur being associated with the oscillation signal; and
   a combiner within the digital processor configured to subtract the spur cancellation signal from the digital information;
   wherein the digital clock spur is caused by the digital clock from the digital clock generator such that shifts in the digital clock spur are also represented by same shifts in the spur cancellation signal; and
   wherein the spur cancellation signal ($s_k$) is represented by the following equation:

$$s_k = \alpha_k \cos(\omega_0 k + \phi_k);$$

where $\alpha_k$ represents an estimated amplitude value, $\phi_k$ represents an estimated phase value, and $\omega_0$ represents an angular frequency associated with a nominal spur frequency ($f_0$) for the digital clock spur and a sampling frequency ($f_s$) for the sampling clock; and
   where $\omega_0$ is represented by the following equation: $\omega_0 = 2\pi(f_0/f_s)$.

2. The spur cancellation system of claim 1, wherein an additional digital clock spur is caused by an additional digital clock generator configured to output at least one additional digital clock signal based upon the oscillation signal.

3. The spur cancellation system of claim 1, further comprising:
   a radio frequency (RF) front-end and a mixer configured to receive the RF input signals and to output the analog signals associated with the channel.

4. The spur cancellation system of claim 1, wherein the digital processor is configured to demodulate the digital information to output the digital data.

5. The spur cancellation system of claim 1, wherein the spur cancellation module comprises a spur generator configured to receive the nominal spur frequency associated with the digital clock spur, to receive spur parameters comprising the estimated amplitude value and the estimated phase value, and to generate the spur cancellation signal.

6. The spur cancellation system of claim 5, wherein the spur parameters further comprise a frequency adjustment value for the spur cancellation signal.

7. The spur cancellation system of claim 5, wherein the spur cancellation module further comprises a spur adjustment module configured to provide the spur parameters to the spur cancellation signal generator and to adjust the spur parameters based upon an output from the combiner as feedback.

8. The spur cancellation system of claim 1, further comprising a control module configured to receive a channel select signal, to determine the digital clock spur for the selected channel, and to provide control signals to cause generation of the spur cancellation signal.

9. The spur cancellation system of claim 8, further comprising a lookup table configured to store an indication of digital clock spurs that fall within each of a plurality of selectable channels, and wherein the control module is configured to use the lookup table to determine the digital clock spur for the selected channel.

10. The spur cancellation system of claim 1, wherein the digital processor, the digital clock generator, the spur cancellation module, and the combiner are within a first receive path; and further comprising at least one additional receive path, each additional receive path including an additional digital processor, an additional digital clock generator, an additional spur cancellation module, and an additional combiner.

11. The spur cancellation system of claim 10, wherein each receive path comprises a separate spur cancellation module for each receive path.

12. The spur cancellation system of claim 11, wherein each of the separate spur cancellation modules within each receive path is configured to generate spur cancellation signals for digital clock spurs caused by one of the receive paths.

13. The spur cancellation system of claim 10, further comprising a control module configured to receive channel select signals for the receive paths, to determine spurs that fall within selected channels, and to provide control signals to the receive paths to cause generation of the spur cancellation signals.

14. The spur cancellation system of claim 13, further comprising a lookup table configured to store an indication of digital clock spurs that fall within selectable channels, and wherein the control module is configured to use the lookup table to provide the control signals.

15. The spur cancellation system of claim 1, wherein the digital processor is further configured to generate a control signal based upon the digital information, the control signal determining at least in part whether or not the spur cancellation module generates a spur cancellation signal.

16. A method for spur cancellation, comprising:
Converting, by an analog-to-digital converter (ADC), analog signals associated with a channel within radio frequency (RF) input signals into digital information based upon a sampling clock;
processing, by a digital processor, the digital information based upon a digital clock to output digital data associated with a the channel;
generating, by a controlled oscillator, an oscillation signal;
generating the sampling clock and the digital clock based upon the oscillation signal;
generating, by a spur cancellation module, a spur cancellation signal associated with a digital clock spur that falls within the channel using the digital clock, the digital clock spur being associated with the oscillation signal; and
subtracting, by a combiner, the spur cancellation signal from the digital information as part of the processing step;
wherein the digital clock spur is caused by the digital clock such that shifts in the digital clock spur are also represented by same shifts in the spur cancellation signal; and
wherein the spur cancellation signal (Sk) is represented by the following equation:

$$s_k = \alpha_k \cos(\omega_0 k + \phi_k);$$

where $\alpha_k$ represents an estimated amplitude value, $\phi_k$ represents an estimated phase value, and $\omega_0$ represents an angular frequency associated with a nominal spur frequency ($f_0$) for the digital clock spur and a sampling frequency ($f_s$) for the sampling clock; and
where $\omega_0$ is represented by the following equation: $\omega_0 = 2\pi (f_0/f_s)$.

17. The method of claim 16, wherein the processing step comprises demodulating the digital information to output the digital data.

18. The method of claim 16, wherein the generating a spur cancellation signal step comprises receiving the nominal spur frequency associated with the digital clock spur and using spur parameters comprising the estimated amplitude value and the estimated phase value to generate the spur cancellation signal.

19. The method of claim 18, wherein the spur parameters further comprise a frequency adjustment value for the spur cancellation signal.

20. The method of claim 18, further comprising adjusting the spur parameters based upon a result of the subtracting step.

21. The method of claim 20, further comprising generating a control signal based upon the digital information to determine at least in part an update speed for the adjusting step.

22. The method of claim 16, further comprising receiving a channel select signal and determining the digital clock spur based upon the selected channel.

23. The method of claim 22, further comprising using a lookup table to determine the digital clock spur for the selected channel.

24. The method of claim 16, wherein the processing, generating, and subtracting steps are performed within a first receive path, and further comprising performing these steps in at least one additional receive path.

25. The method of claim 24, wherein each receive path generates spur cancellation signals for digital clock spurs caused by at least one digital clock within each additional receive path.

26. The method of claim 25, further comprising receiving a channel select signal for each receive path and using a lookup table to determine digital clock spurs that fall within selected channels.

* * * * *

UNITED STATES PATENT AND TRADEMARK OFFICE
CERTIFICATE OF CORRECTION

| | | |
|---|---|---|
| PATENT NO. | : 9,160,465 B2 | Page 1 of 1 |
| APPLICATION NO. | : 14/074355 | |
| DATED | : October 13, 2015 | |
| INVENTOR(S) | : Guner Arslan | |

It is certified that error appears in the above-identified patent and that said Letters Patent is hereby corrected as shown below:

Claims

In claim 16, column 13, line 32, delete "Converting" and insert --converting--.

In claim 16, column 13, line 37, delete "a the" and insert --the--.

Signed and Sealed this
Twenty-second Day of March, 2016

Michelle K. Lee
*Director of the United States Patent and Trademark Office*